(12) United States Patent
Budigere Vijaya Kumar et al.

(10) Patent No.: US 11,029,988 B2
(45) Date of Patent: Jun. 8, 2021

(54) STORAGE RESERVATION POOLS FOR VIRTUAL INFRASTRUCTURE

(71) Applicant: VMWARE, INC., Palo Alto, CA (US)

(72) Inventors: Kaushik Budigere Vijaya Kumar, Bangalore (IN); Akanksha Patel, Bangalore (IN); Akhil Ram Sai Sattiraju, Bangalore (IN); Ankit Dubey, Bangalore (IN); Ankit Vaidya, Bangalore (IN); Apurva Hajare, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 92 days.

(21) Appl. No.: 16/159,758

(22) Filed: Oct. 15, 2018

(65) Prior Publication Data

US 2020/0034179 A1    Jan. 30, 2020

(30) Foreign Application Priority Data

Jul. 30, 2018    (IN) .............................. 201841028487

(51) Int. Cl.
*G06F 9/455* (2018.01)
*G06F 13/42* (2006.01)

(52) U.S. Cl.
CPC ...... *G06F 9/45558* (2013.01); *G06F 13/4221* (2013.01); *G06F 2009/45579* (2013.01); *G06F 2009/45583* (2013.01); *G06F 2213/0036* (2013.01)

(58) Field of Classification Search
CPC ............ G06F 9/45558; G06F 13/4221; G06F 2213/0036; G06F 2009/45579; G06F 2009/45583
See application file for complete search history.

(56) References Cited

U.S. PATENT DOCUMENTS

| | | | |
|---|---|---|---|
| 8,832,687 B2 | 9/2014 | Baron | |
| 2014/0109086 A1* | 4/2014 | Mizrahi | G06F 9/45558 718/1 |
| 2014/0156910 A1* | 6/2014 | Uttamchandani | G06F 3/061 711/103 |
| 2015/0006788 A1* | 1/2015 | Liu | G06F 3/0685 711/103 |
| 2015/0081994 A1* | 3/2015 | Christopher | G06F 11/1458 711/162 |

* cited by examiner

*Primary Examiner* — Sisley N Kim
(74) *Attorney, Agent, or Firm* — SU IP Consulting

(57) ABSTRACT

A method to allocate storage includes assigning a quota on space from a storage reservation pool, allocating an epoch specific storage space to a virtual disk, creating a memory map for the virtual disk to track used space. For every write to the virtual disk during an epoch, the method includes updating the memory map, determining if the used space is greater than a threshold of the epoch specific storage space based on the memory map. When the used space is greater than the threshold, the method includes predicting additional space for future writes to the virtual disk in the epoch, determining if the additional space is available from the storage reservation pool, and, when the additional space is available, increasing the epoch specific storage and proceeding with the write to the virtual disk.

27 Claims, 3 Drawing Sheets

STORAGE RESERVATION POOLS FOR VIRTUAL INFRASTRUCTURE

RELATED APPLICATIONS

Benefit is claimed under 35 U.S.C. 119(a)-(d) to Foreign Application Serial No. 201841028487 filed in India entitled "STORAGE RESERVATION POOLS FOR VIRTUAL INFRASTRUCTURE", on Jul. 30, 2018, by VMware, Inc., which is herein incorporated in its entirety by reference for all purposes.

BACKGROUND

Storage for virtual infrastructure such as virtual machines can be of two types: thick-provisioned and thin-provisioned. Thick provisioning works by allocating a fixed amount of storage for an individual virtual disk irrespective of whether that storage is ever utilized. Thin provisioning involves using storage virtualization technology to give the appearance of having more physical storage than is available. Over-allocation or over-subscription is a mechanism that allows a server to view more storage capacity than has been physically reserved on the storage array itself. This allows flexibility in growth of storage volumes, without having to predict accurately how much a volume will grow.

DETAILED DESCRIPTION

Figure 1:
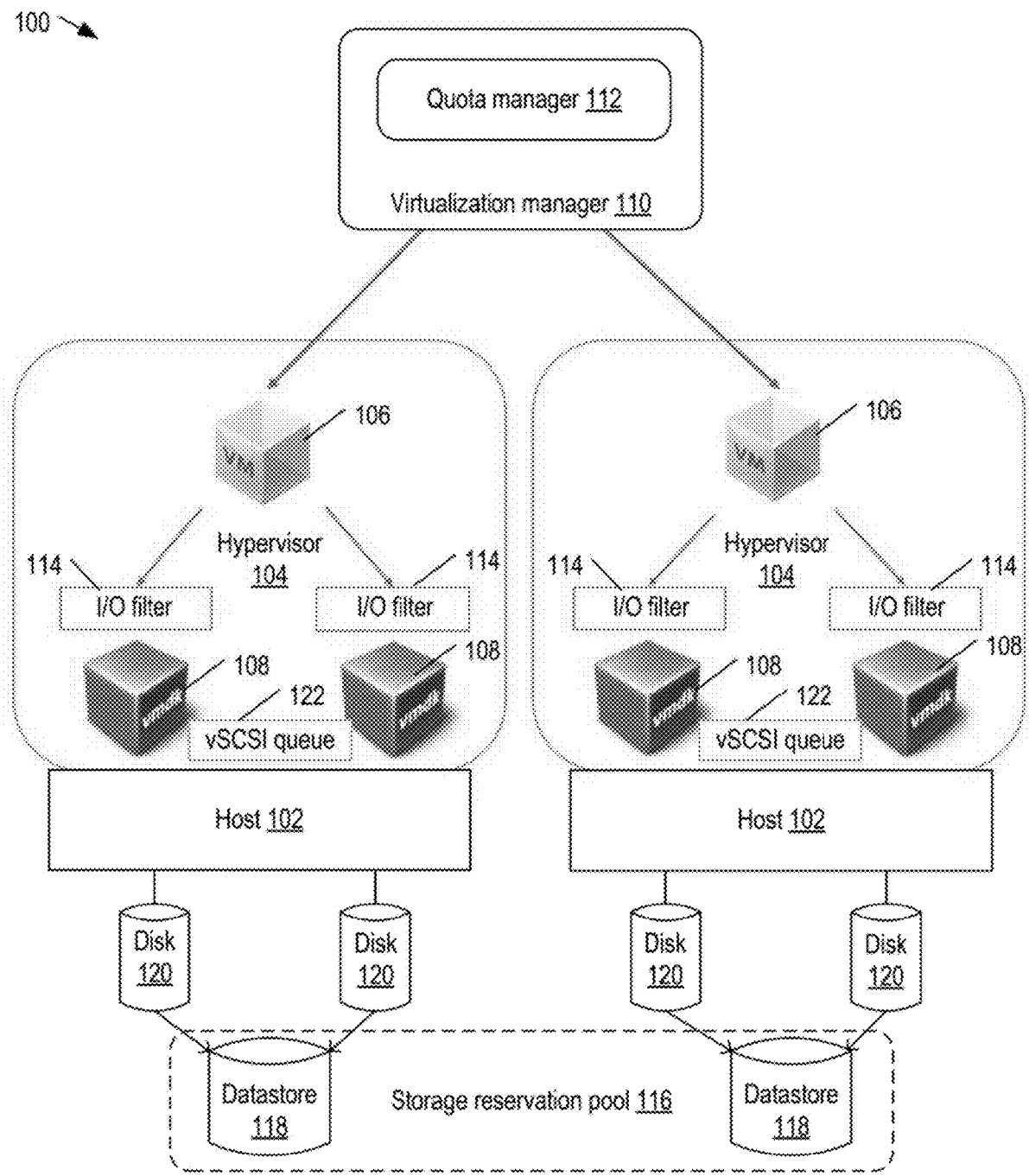
FIG. 1 is a block diagram illustrating a computing system in some examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Currently the mechanism of allocating storage in a thin-provisioned manner has a disadvantage of not accounting for the actual consumption of storage resource for each virtual disk. In an organization, different entities (e.g., departments) might have differing rates of consumption of storage resources. In thin provisioning, the storage resources would be exhausted across the organization if one department grows inordinately and singly consumes all the resources. Pooled storage solves this by allowing arbitrary recursive grouping of virtual disks, thereby "sandboxing" a virtual disk in one or more pools so that limits of a pool is hit first before the organization limit exhausts.

FIG. 1 is a block diagram illustrating a virtual infrastructure or computing system 100 in some examples of the present disclosure. System 100 includes host computers 102 each running a hypervisor 104, which runs at least one virtual machine 106. Virtual machine 106 runs a guest operating system (OS), which runs one or more applications. One or more virtual disks 108 are attached to each virtual machine 106. Each virtual disk 108 is a file or a set of files (e.g., a VMDK file) that appears as a physical disk drive to the guest OS on virtual machine 106. One of host computers 102 or a separate host computer (not shown) may run a management server 110. Through hypervisors 104, management server 110 centrally manages virtual and physical objects in computing system 100, such as hypervisors 104, virtual machines 106, and datastores 118. Hypervisor 104 includes a virtual SCSI (small computer system interface) controller queue 122 that buffers inputs/outputs between VMs 106 and local hard disks 120 on each host 102. Computing system 100 may be a VMware vSphere data center, hypervisor 104 may be VMware vSphere ESXi hypervisor, and management server 110 may be VMware vCenter Server.

Examples of the present disclosure provide a pooled storage with two main components: a quota manager 112 and an input/output (I/O) filter 114, which is installed by quota manager 112 on each virtual disk 108. I/O filter 114 is a software component of hypervisor 104 that processes I/O requests moving between the guest OS of a virtual machine 106 and its virtual disks 108.

Quota manager 112 is part of management server 110. Quota manager 112 creates and manages one or more storage reservation pools 116. Storage reservation pool 116 consists one or more datastores 118 having storage that can be allocated to virtual disks 108. A datastore 118 is a logical container of physical storage, such as local hard disks 120 on host computers 102 or remote storage accessed through a network.

Quota Manager 112 monitors total available (unused) storage of every storage reservation pool and manages the storage quota of every storage reservation pool. Each storage reservation pool 116 has a pre-defined hard quota on available space (e.g., 5% of capacity). When the combined allocated space of all virtual disks 108 in one reservation pool 116 is greater than this hard quota, quota manager 112 fails further writes into any of the virtual disk 108 in that pool 116 and issues an error (e.g., "error: no space left" or "ENOSPC"). Each storage reservation pool 116 may have a pre-defined soft quota on available space (e.g., 20% of capacity). When this soft quota is exceeded, quota manager 112 alerts an administrator or user that available space is running low.

Each virtual disk 108 may belong to (use storage from) one or more storage reservation pools 116. Quota manager 112 allocates an epoch specific storage space to every virtual disk 108 (via its I/O filter 114) for an epoch of time (time interval). The epoch specific storage space represents the maximum amount of storage space that virtual disk 108 may utilize for this epoch.

Each I/O filter 114 filter accounts for used spaced consumed by its virtual disk 108. The naïve way of doing this would be to query virtual disk 108 with every write operation. However, this would increase the overhead of I/O operations. To overcome this, I/O filter 114 maintains a memory map of its virtual disk 108. The memory map includes a list of all the sections of virtual disk 108 (e.g., sectors or file system logical blocks) that have been used and the amount of data written to the sections. With every write operation, I/O filter 114 receives the write location in virtual disk 108 and the amount of the data that is to be written. I/O filter 114 then updates the memory map while ignoring any overlap in the memory locations. In the epoch, when I/O filter 114 determines the used space consumed by virtual disk 108 is greater than a pre-defined threshold of the epoch specific storage space, I/O filter 114 requests quota manager 112 for additional storage.

In a separate thread, I/O filter 114 predicts the amount of data it will be writing in its virtual disk 108 in the current epoch. I/O filter 114 bases its prediction on the prior usage pattern, such as earlier write operations. If quota manager 112 determines there is enough available storage, quota manager 112 increases the epoch specific storage space of the virtual disk 108 (via its I/O filter 114).

At the end of the epoch, I/O filter 114 returns any unused space from the epoch specific storage space back to quota manager 112 and requests quota manager 112 for a new epoch specific storage space. This ensures that no virtual disk 108 is holding more storage than it requires. At the end of the epoch, quota manager 112 may adjust the epoch specific storage space assigned to the virtual disk 108 based its usage pattern, which quota manager 112 gathers from I/O filter 114. If virtual disk 108 is underutilized, quota manager 112 may reduce the epoch specific storage space and vice versa. This ensures that no virtual disk 108 assigned more storage more than it requires.

Figure 2:
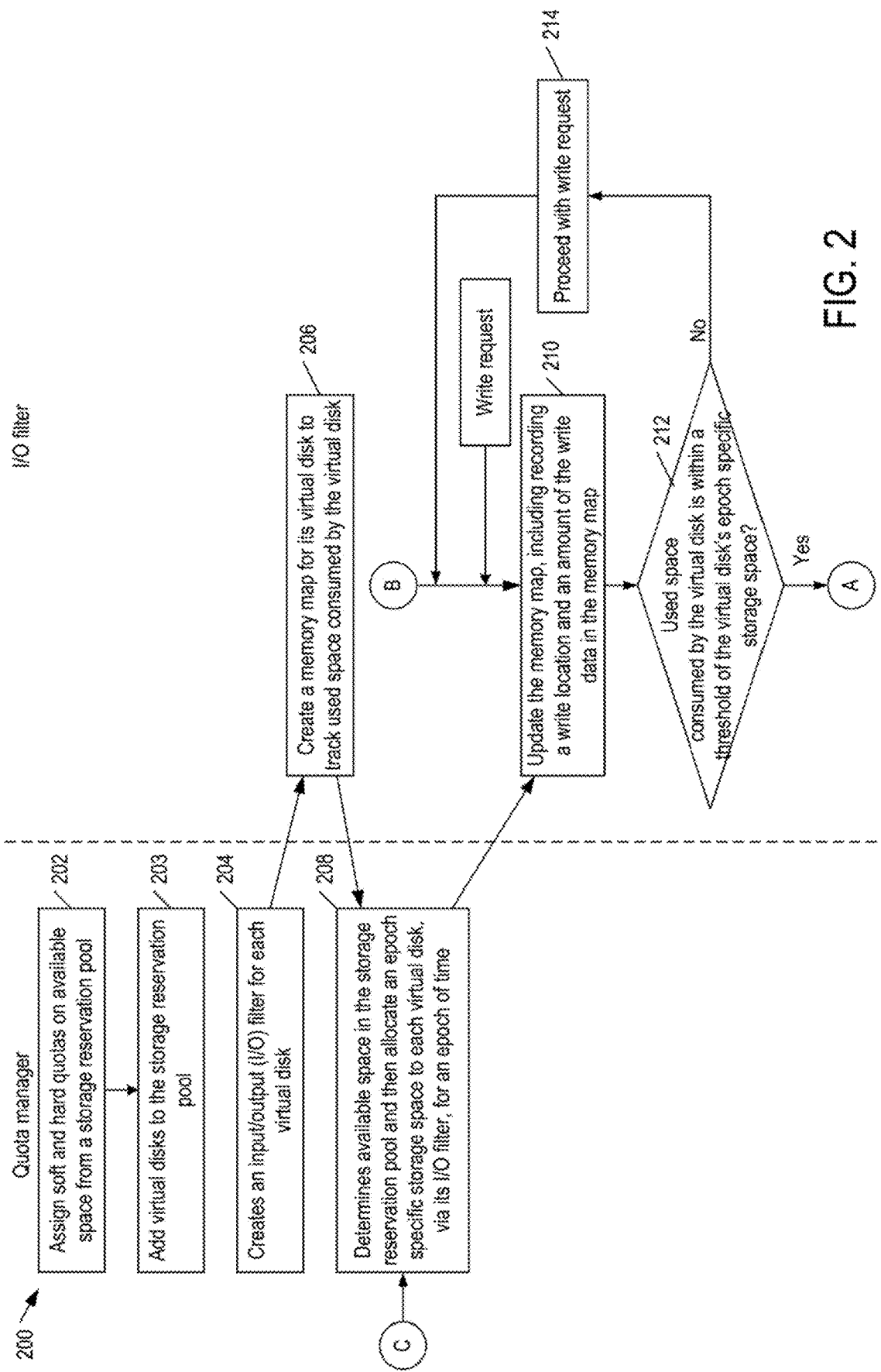
FIG. 2 and FIG. 3 combine to show a block diagram illustrating a flowchart of a method for a quota manager and an input/output filter of FIG. 1 to provision storage from a storage reservation pool to virtual disks of virtual machines of FIG. 1 in some examples of the present disclosure.
Figure 3:
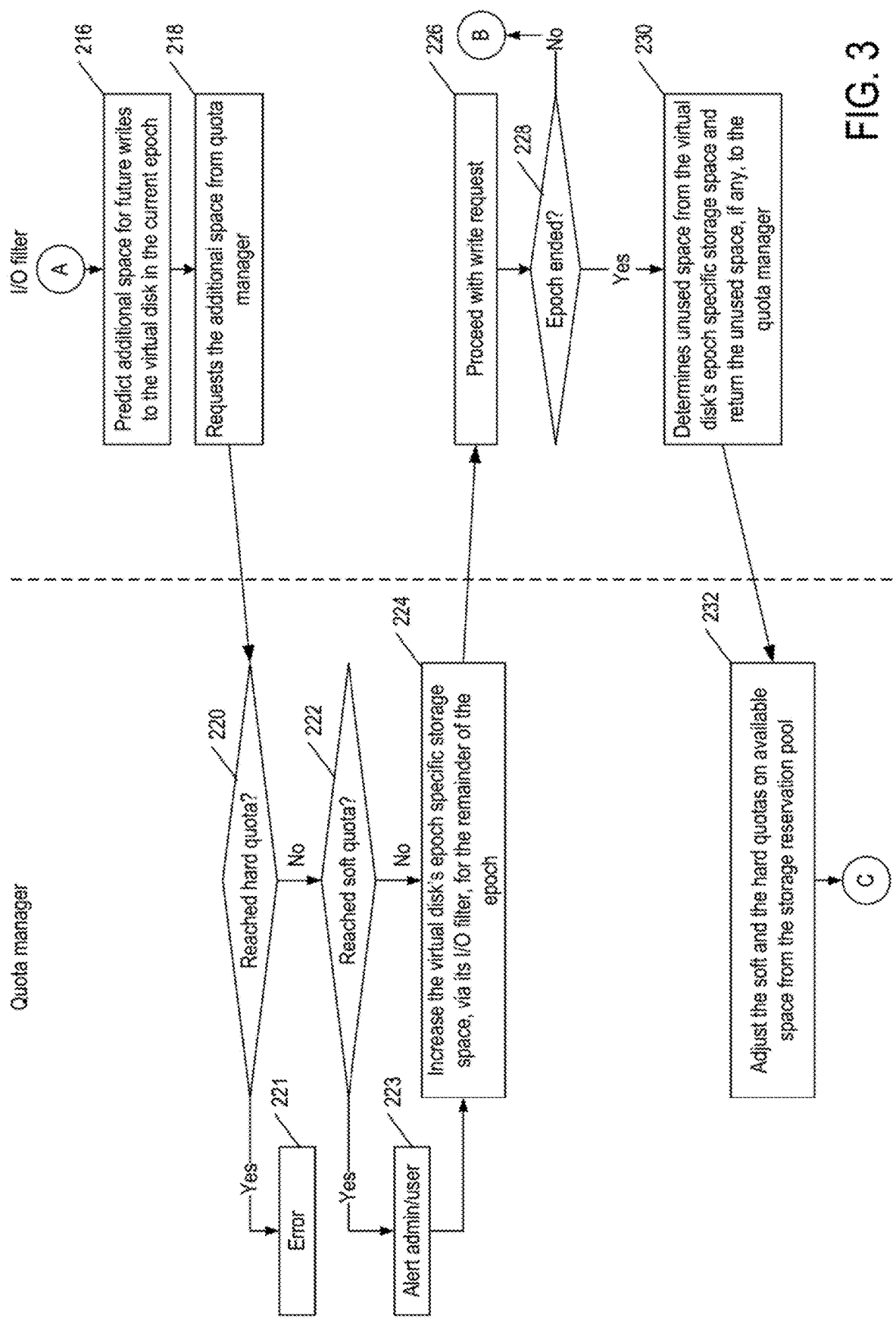

FIGS. 2 and 3 combine to show a block diagram illustrating a flowchart of a method 200 for quota manager 112 and I/O filter 114 (FIG. 1) to provision storage from a storage reservation pool 116 (FIG. 1) to virtual disks 108 (FIG. 1) of virtual machines 106 (FIG. 1) in some examples of the present disclosure. Method 200, and any method described herein, may be implemented as instructions encoded on a computer-readable medium that is to be executed by a processor in a computer system. Method 200, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 200 may begin in block 202.

Referring to FIG. 2, in block 202, under administrator or user instructions, quota manager 112 assigns soft and hard quotas on available space from storage reservation pool 116. Block 202 may be followed by block 203.

In block 203, under administrator or user instructions, quota manager 112 adds virtual disks 108 to storage reservation pool 116. Block 203 may be followed by block 204.

In block 204, quota manager 112 creates an input/output (I/O) filter 114 for each virtual disk 108. Block 204 may be followed by block 206.

In block 206, each input/output (I/O) filter 114 creates a memory map for its virtual disk 108 to track used space consumed by the virtual disk 108. Block 206 may be followed by block 208.

In block 208, quota manager 112 determines the available space in storage reservation pool 116 and then allocates an epoch specific storage space to every virtual disk 108, via its I/O filter 114, for an epoch of time (time interval). Quota manager 112 may determine the size of the epoch specific storage space based on the available space in storage reservation pool 116 and the number of virtual disks 108. Quota manager 112 may further determine the size of the epoch specific storage space based on the usage pattern of each virtual disk 108, if available from its I/O filter 114. For example, when the available space is large, quota manager 112 may be generous and give each virtual disk 108 the same large epoch specific storage space. When the available space falls below a certain level, such as the soft quota on the available space, quota manager 112 may base the epoch specific storage space for each virtual disk 108 on its usage pattern, such as the average writes in an X number of previous epochs. In block 208, quota manager 112 also starts a counter for the epoch. Block 208 may be followed by block 210.

Blocks 210 to 218 and 226 to 230 are performed each time an I/O filter 114 receives a write request to its virtual disk 108 during the epoch. In block 210, I/O filter 114 updates the memory map, including recording a write location and an amount of the write data in the memory map. For simplicity, I/O filter 114 ignores any overlap in write locations. For example, if sections 1 and 2 were previously written, a new write to sections 1 to 3 ignores sections 1 and 2 as they are already marked in the memory map. Block 210 may be followed by block 212.

In block 212, I/O filter 114 determines if the used space consumed by virtual disk 108 is greater than a threshold of its epoch specific storage space. If not, block 212 may be followed by block 214. Otherwise block 212 may be followed by block 216. I/O filter 114 determines the used space consumed by virtual disk 108 based on its memory map. To save overhead, I/O filter 114 does not query storage reservation pool 116 or its underlying physical storage for the used space of virtual disk 108.

In block 214, when I/O filter 114 determines the used space is not greater than the threshold virtual disks 108's epoch specific storage space, I/O filter 114 proceeds with the write request to virtual disk 108. Block 214 may loop back to block 210 to process another write request.

In block 216 (FIG. 3), when I/O filter 114 determines the used space is greater than the threshold of virtual disks 108's epoch specific storage space, I/O filter 114 predicts additional space for future writes to virtual disk 108 in the current epoch. I/O filter 114 may base its prediction on a usage pattern virtual disk 108. For example, I/O filter 114 may extrapolate the write operations received earlier in the epoch for the remainder of the epoch. Alternatively, I/O filter 114 may use the average writes received in the previous X numbers of epochs. Block 216 may be followed by block 218.

In block 218, I/O filter 114 requests the additional space from quota manager 112. Block 218 may be followed by block 220.

In block 220, quota manager 112 determines if allocating the additional space from storage reservation pool 116 would push its available space below the hard quota. If so, block 220 may be followed by block 221. Otherwise block 220 may be followed by block 222. Quota manager 112 may determine the available space from storage reservation pool 116 by querying storage reservation pool 116 or its underlying physical storage. Alternatively, quota manager 112 may have set aside a reserved portion of the storage from storage reservation pool 116 and determine if the reserved portion has the additional space without querying storage reservation pool 116 or its underlying physical storage.

In block 221, when quota manager 112 determines allocating the additional space from storage reservation pool 116 pushes its available space below the hard quota, quota manager 112 issues an error (e.g., ENOSPC) via I/O filter 114 to the write requester. Quota manager 112 also alerts an administrator or a user that storage reservation pool 116 has reached its hard threshold on the available space.

In block 222, quota manager 112 determines if allocating the additional space from storage reservation pool 116 would push its available space below the soft quota. If so, block 222 may be followed by block 223. Otherwise block 222 may be followed by block 224.

In block 223, when quota manager 112 determines allocating the additional space from storage reservation pool 116 pushes its available space below the soft quota, quota manager 112 alerts an administrator or a user that storage reservation pool 116 has reached its soft threshold on the available space. For example, quota manager 112 sends an email or a text to the administrator or the user. Block 223 may be followed by block 224.

In block 224, quota manager 112 increases virtual disk 108's epoch specific storage space, via I/O filter 114, by the requested amount for the remainder of the epoch.

Alternatively, quota manager 112 increases virtual disk 108's epoch specific storage space, via I/O filter 114, by a different amount for the remainder of the epoch. For example, quota manager 112 queries vSCSI controller queue 122 (FIG. 1) in each host 102 (FIG. 1) to determine the I/O throughput between VMs 106 (FIG. 1) and local hard disks 120 (FIG. 1) on each host 102. The I/O throughput may be for the current epoch or several previous epochs. Based on the I/O throughput, quota manager 112 estimates the needed space for the remainder of epoch for virtual disks 108 that reside (at least partially) on local hard disks 120 on each host 102, and then apportions the needed space between all virtual disks 108. In response to an I/O filter 114's request for additional space, quota manager 112 increases virtual disk 108's epoch specific storage space, via I/O filter 114, by the needed space for the remainder of the epoch.

Block 224 may be followed by block 226.

In block 226, I/O filter 114 proceeds with the write request to virtual disk 108. Block 226 may be followed by block 228.

In block 228, I/O filter 114 determines if the epoch has ended. If not, block 228 may loop back to block 210 (FIG. 2) to process another write request. Otherwise block 228 may be followed by block 230.

In block 230, at the end of the epoch, I/O filter 114 determines the unused space from virtual disk 108's epoch specific storage space and returns the unused space, if any, to quota manager 112. I/O filter 114 also requests quota manager 112 to allocate virtual disk 108's new epoch specific storage space. I/O filter 114 may base its request for the new epoch specific storage space on the usage pattern of its virtual disk 108. For example, I/O filter 114 may use the average writes received in the previous X numbers of epochs. Block 230 may be followed by optional block 232.

In optional block 232, quota manager 112 may prompt the administrator or user to adjust the soft and the hard quotas on the available space from storage reservation pool 116. Quota manager 112 may advise the admin or user to adjust the soft and the hard quotas based on usage patterns virtual disks 108 collected by their I/O filters 114 and the available space in storage reservation pool 116. Under administrator or user instructions, quota manager 112 may change the soft and hard quotas.

Optional block 232 may be followed by block 208 (FIG. 2) where quota manager 112 determines the available space in storage reservation pool 116 and allocates a new epoch specific storage space to every virtual disk 108, via its I/O filter 114, for the next epoch. As previously mentioned, quota manager 112 may determine virtual disk 108's epoch specific storage space for the next epoch based on a usage pattern of virtual disk 108 collected by the corresponding I/O filter 114 and the available space in storage reservation pool 116. Quota manager 112 may further determine virtual disk 108's epoch specific storage space for the next epoch based on the requested epoch specific storage space from I/O filter 114.

Alternatively, quota manager 112 allocates a new epoch specific storage space for every virtual disk 108 based on I/O throughput of vSCSI controller queue 122 (FIG. 1) in each host 102 (FIG. 1). Quota manger 112 queries vSCSI controller queue 122 on each host 102 to determine the I/O throughput between VMs 106 (FIG. 1) and local hard disks 120 (FIG. 1) on each host 102. The I/O throughput may be for the current epoch or several previous epochs. Based on the I/O throughput, quota manager 112 estimates the needed space for the next epoch for virtual disks 108 that reside (at least partially) on local hard disks 120 on each host 102, and then apportions the needed space between all virtual disks 108. Quota manager 112 allocates the new epoch specific storage space, via I/O filter 114, by the needed space for the next epoch.

In some examples, another software component may perform the functionalities of I/O filter 114 described above. For example, a file system driver or a storage driver in the guest OS may perform the functionalities of I/O filter 114.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for a computing system to allocate storage from a storage reservation pool to virtual disks of virtual machines, the method comprising:
assigning a quota on available space from the storage reservation pool;
adding the virtual disks to the storage reservation pool;
for each virtual disk belonging to the storage reservation pool:
allocating a first epoch specific storage space to the virtual disk based on the available space in the storage reservation pool, wherein the first epoch specific storage space corresponds to a first epoch of time, and the first epoch of time occurs prior to a second epoch of time;
creating a memory map for the virtual disk to track space used by the virtual disk;
for every write request to the virtual disk during the first epoch:
updating the memory map with information about the write request, including a write location and an amount of data written;
based on the memory map and without querying the storage reservation pool, determining if the used space consumed by the virtual disk is greater than a threshold of the first epoch specific storage space; and
when the used space is greater than the threshold of the first epoch specific storage space:
predicting additional space that will be consumed by other writes for the remainder of the first epoch to the virtual disk;
determining if the additional space is available from the storage reservation pool; and
when the additional space is available from the storage reservation pool:

increasing the first epoch specific storage space by the additional space; and proceeding with the write request to the virtual disk.

2. The method of claim 1, further comprising, at the end of the first epoch:

based on the memory map, determining unused space in the first epoch specific storage space and returning the unused space to the available space from the storage reservation pool; and determining the available space in the storage reservation pool and allocating a second epoch specific storage space to the virtual disk for the second epoch.

3. The method of claim 1, wherein the allocating is based on a usage pattern of the virtual disk and the available space in the storage reservation pool.

4. The method of claim 1, wherein:

the storage reservation pool includes one or more datastores each comprising local hard disks on host computers; and the allocating is based on input/output throughput of a virtual small computer system interface (vSCSI) controller queue in each host computer that buffers inputs/outputs between virtual machines and local hard disks on each host computer.

5. The method of claim 1, wherein the predicting is based on a usage pattern of the virtual disk.

6. The method of claim 1, further comprising suggesting a new quota on the available space from the storage reservation pool based on the available storage in the storage reservation pool.

7. The method of claim 1, wherein the determining if the additional space is available from the storage reservation pool comprises querying the storage reservation pool.

8. The method of claim 1, wherein the updating the memory map further includes ignoring overlap in write locations to save overhead so previously written locations are not recorded again.

9. The method of claim 1, further comprising, when the used space is not greater than the threshold of the first epoch specific storage space, proceeding with the write request.

10. A non-transitory, computer-readable storage medium encoded with instructions executable by a processor to allocate storage from a storage reservation pool to virtual disks of virtual machines, the instructions comprising:

assigning a quota on available space from the storage reservation pool;

adding the virtual disks to the storage reservation pool;

for each virtual disk belonging to the storage reservation pool:

allocating a first epoch specific storage space to the virtual disk based on the available space in the storage reservation pool, wherein the first epoch specific storage space corresponds to a first epoch of time, and the first epoch of time occurs prior to a second epoch of time;

creating a memory map for the virtual disk to track space used by the virtual disk;

for every write request to the virtual disk during the first epoch:

updating the memory map with information about the write request, including a write location and an amount of data written;

based on the memory map and without querying the storage reservation pool, determining if the used space consumed by the virtual disk is greater than a threshold of the first epoch specific storage space; and when the used space is greater than the threshold of the first epoch specific storage space:

predicting additional space that will be consumed by other writes for the remainder of the first epoch to the virtual disk;

determining if the additional space is available from the storage reservation pool; and when the additional space is available from the storage reservation pool:

increasing the first epoch specific storage space by the additional space; and proceeding with the write request to the virtual disk.

11. The non-transitory, computer-readable storage medium of claim 10, wherein the instructions further comprise, at the end of the first epoch:

based on the memory map, determining unused space in the first epoch specific storage space and returning the unused space to the available space from the storage reservation pool; and determining the available space in the storage reservation pool and allocating a second epoch specific storage space to the virtual disk for the second epoch.

12. The non-transitory, computer-readable storage medium of claim 10, wherein the allocating is based on a usage pattern of the virtual disk and the available space in the storage reservation pool.

13. The non-transitory, computer-readable storage medium of claim 10, wherein:

the storage reservation pool includes one or more datastores each comprising local hard disks on host computers; and the allocating is based on input/output throughput of a virtual small computer system interface (vSCSI) controller queue in each host computer that buffers inputs/outputs between virtual machines and local hard disks on each host computer.

14. The non-transitory, computer-readable storage medium of claim 10, wherein the predicting is based on a usage pattern of the virtual disk.

15. The non-transitory, computer-readable storage medium of claim 10, wherein the instructions further comprise suggesting a new quota on the available space from the storage reservation pool based on the available storage in the storage reservation pool.

16. The non-transitory, computer-readable storage medium of claim 10, wherein the determining if the additional space is available from the storage reservation pool comprises querying the storage reservation pool.

17. The non-transitory, computer-readable storage medium of claim 10, wherein the updating the memory map further includes ignoring overlap in write locations to save overhead so previously written locations are not recorded again.

18. The non-transitory, computer-readable storage medium of claim 10, wherein the instructions further comprise, when the used space is not greater than the threshold of the first epoch specific storage space, proceeding with the write request.

19. A computer system, comprising:

one or more host computers, each host computer running a hypervisor, the hypervisor running one or more virtual machines, each virtual machine having one or more virtual disks and one or more input/output (I/O) filters installed on the one or more virtual disks, respectively, a processor;

a computer-readable medium encoded with instructions, when executable by the processor, causes the processor configured to:

create a storage reservation pool from one or more datastores;

for each virtual disk belonging to the storage reservation pool:
- assign a quota on available space from the storage reservation pool;
- add the virtual disk to the storage reservation pool;
- create an I/O filter for the virtual disk;
- allocate a first epoch specific storage space to the virtual disk based on the available space in the storage reservation pool, wherein the first epoch specific storage space corresponds to a first epoch of time, and the first epoch of time occurs prior to a second epoch of time;
- the I/O filter is configured to create a memory map for the virtual disk to track space used by the virtual disk;
- each time the I/O filter receives a write request to the virtual disk during the first epoch:
  - the I/O filter is configured to update the memory map, including recording a write location and an amount of the write data in the memory map;
  - based on the memory map and without querying the storage reservation pool, the I/O filter is configured to determine if the used space consumed by the virtual disk is greater than a threshold of the first epoch specific storage space; and
  - when the I/O filter determines the used space is greater than the threshold of the first epoch specific storage space:
    - the I/O filter is configured to predict additional space that will be consumed by other writes for the remainder of the first epoch to the virtual disk;
    - the I/O filter is configured to request the additional space;
    - the processor is configured to determine if the additional space is available from the storage reservation pool; and
    - when the processor determines the additional space is available from the storage reservation pool:
      - the processor is configured to increase the first epoch specific storage space by the additional space; and
      - the I/O filter is configured to proceed with the write request to the virtual disk.

20. The system of claim 19, wherein, at the end of the first epoch:
the I/O filter is configured to, based on the memory map, determine unused space in the first epoch specific storage space and return the unused space to the available space from the storage reservation pool; and
the processor is configured to determine the available space in the storage reservation pool and allocating a second epoch specific storage space to the virtual disk for the second epoch.

21. The system of claim 19, wherein the allocating is based on a usage pattern of the virtual disk and the available space in the storage reservation pool.

22. The system of claim 19, wherein:
the storage reservation pool includes one or more datastores each comprising local hard disks on host computers; and
the allocating is based on input/output throughput of a virtual small computer system interface (vSCSI) controller queue in each host computer that buffers inputs/outputs between virtual machines and local hard disks on each host computer.

23. The system of claim 19, wherein the predicting is based on a usage pattern of the virtual disk.

24. The system of claim 19, wherein the instructions further comprise suggesting a new quota on the available space from the storage reservation pool based on the available storage in the storage reservation pool.

25. The system of claim 19, wherein the determining if the additional space is available from the storage reservation pool comprises querying the storage reservation pool.

26. The system of claim 19, wherein the updating the memory map further includes ignoring overlap in write locations to save overhead so previously written locations are not recorded again.

27. The system of claim 19, wherein when the I/O filter determines the used space is not greater than the threshold of the epoch specific storage space, the I/O filter proceeds with the write request.

\* \* \* \* \*